(12) United States Patent
Chen et al.

(10) Patent No.: US 7,744,172 B2
(45) Date of Patent: Jun. 29, 2010

(54) COMPUTER ENCLOSURE WITH INTERCHANGEABLE I/O PLATE

(75) Inventors: Wen-Tzu Chen, Taipei Hsien (TW); Li-Ping Chen, Taipei Hsien (TW); Chia-Kang Wu, Taipei Hsien (TW); Yi-Lung Chou, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 386 days.

(21) Appl. No.: 11/738,530

(22) Filed: Apr. 23, 2007

(65) Prior Publication Data
US 2008/0151488 A1 Jun. 26, 2008

(30) Foreign Application Priority Data
Dec. 22, 2006 (CN) .................. 2006 2 0016705 U

(51) Int. Cl.
*A47B 88/00* (2006.01)
*H05K 9/00* (2006.01)

(52) U.S. Cl. .................................. 312/223.2; 361/818
(58) Field of Classification Search ............. 312/223.2, 312/223.1, 213, 265.5, 265.6; 174/35 R, 174/50, 58; 454/184; 361/687, 688, 692, 361/818, 816
See application file for complete search history.

(56) References Cited

U.S. PATENT DOCUMENTS

| | | | |
|---|---|---|---|
| 4,286,028 A * | 8/1981 | Heiser et al. .................. 429/82 |
| 5,191,544 A * | 3/1993 | Benck et al. ................. 361/688 |
| 5,317,105 A | 5/1994 | Weber | |
| 5,590,023 A * | 12/1996 | Hernandez et al. ........ 361/679.6 |
| 5,742,003 A * | 4/1998 | Ho .............................. 174/372 |
| 5,838,550 A * | 11/1998 | Morris et al. ............... 361/818 |
| 5,934,775 A * | 8/1999 | Ho .......................... 312/223.2 |
| 5,959,244 A * | 9/1999 | Mayer ........................ 174/369 |
| 5,975,953 A * | 11/1999 | Peterson ................ 439/607.18 |
| 6,239,358 B1 * | 5/2001 | Chang ......................... 174/362 |
| 6,309,037 B2 * | 10/2001 | Bertolami ................. 312/223.2 |
| 6,330,139 B1 * | 12/2001 | Liao ............................. 361/86 |
| 6,339,536 B1 * | 1/2002 | Buican et al. ............... 361/818 |
| 6,349,042 B1 * | 2/2002 | Mills et al. .................. 361/818 |
| 6,390,320 B2 * | 5/2002 | Hurst et al. .................. 220/241 |
| 6,590,848 B1 * | 7/2003 | Chen .......................... 720/654 |
| 7,113,396 B2 * | 9/2006 | Chen et al. .................. 361/683 |
| 7,443,688 B2 * | 10/2008 | Chen et al. .................. 361/726 |
| 7,520,805 B2 * | 4/2009 | Chung ........................ 454/184 |

* cited by examiner

*Primary Examiner*—Darnell Jayne
*Assistant Examiner*—Andres Gallego
(74) *Attorney, Agent, or Firm*—Frank R. Niranjan

(57) ABSTRACT

A computer enclosure includes a rear plate defining a through opening therein, a mounting bracket secured on the rear plate to cover the through opening of the rear plate, and an interchangeable I/O plate. The mounting bracket includes a top wall perpendicular to the rear plate and, a front wall parallel to the rear plate. The top wall forms an engaging tab thereon. The front wall defines a through opening therein corresponding to the through opening of the rear plate. The I/O plate is configured for covering the through opening of the front wall of the mounting bracket, and defines a securing hole therein for receiving the engaging tab of the mounting bracket. A locking piece is formed on the I/O plate and together with the I/O plate sandwiches an edge of the through opening of the mounting bracket therebetween.

12 Claims, 3 Drawing Sheets

COMPUTER ENCLOSURE WITH INTERCHANGEABLE I/O PLATE

BACKGROUND

1. Technical Field

The present invention relates to computer enclosures, and more particularly to a computer enclosure with an I/O plate.

2. General Background

In a computer or server, a plurality of connector openings is arranged in a conventional chassis for inserting corresponding electronic connectors of circuit boards therethrough to thereby connect with electronic connectors outside the chassis. In the conventional chassis, shapes and positions of the connector openings are determined when the chassis is manufactured. So, one type of chassis can only receive the circuit boards, which have the electronic connectors corresponding to the connector openings defined in the chassis. If the electronic connectors of the circuit boards cannot be arranged into corresponding to the connector openings of the chassis, the corresponding circuit boards cannot be used in that particular kind of chassis.

What is needed, therefore, is a computer enclosure with an interchangeable I/O plate which would allow a chassis to be adaptable to receive different types of circuit boards.

SUMMARY

A computer enclosure includes a rear plate defining a through opening therein, a mounting bracket secured on the rear plate to cover the through opening of the rear plate, and an I/O plate. The mounting bracket includes a top wall perpendicular to the rear plate, and a front wall parallel to the rear plate. The top wall forms an engaging tab thereon. The front wall defines a through opening therein corresponding to the through opening of the rear plate. The I/O plate is configured for covering the through opening of the front wall of the mounting bracket, and defines a securing hole therein for receiving the engaging tab of the mounting bracket. A locking piece is formed on the I/O plate and together with the I/O plate sandwiches an edge of the through opening of the front wall of the mounting bracket therebetween.

Other advantages and novel features will be drawn from the following detailed description of preferred embodiments with attached drawings, in which:

DETAILED DESCRIPTION OF PREFERRED EMBODIMENTS

Figure 1:
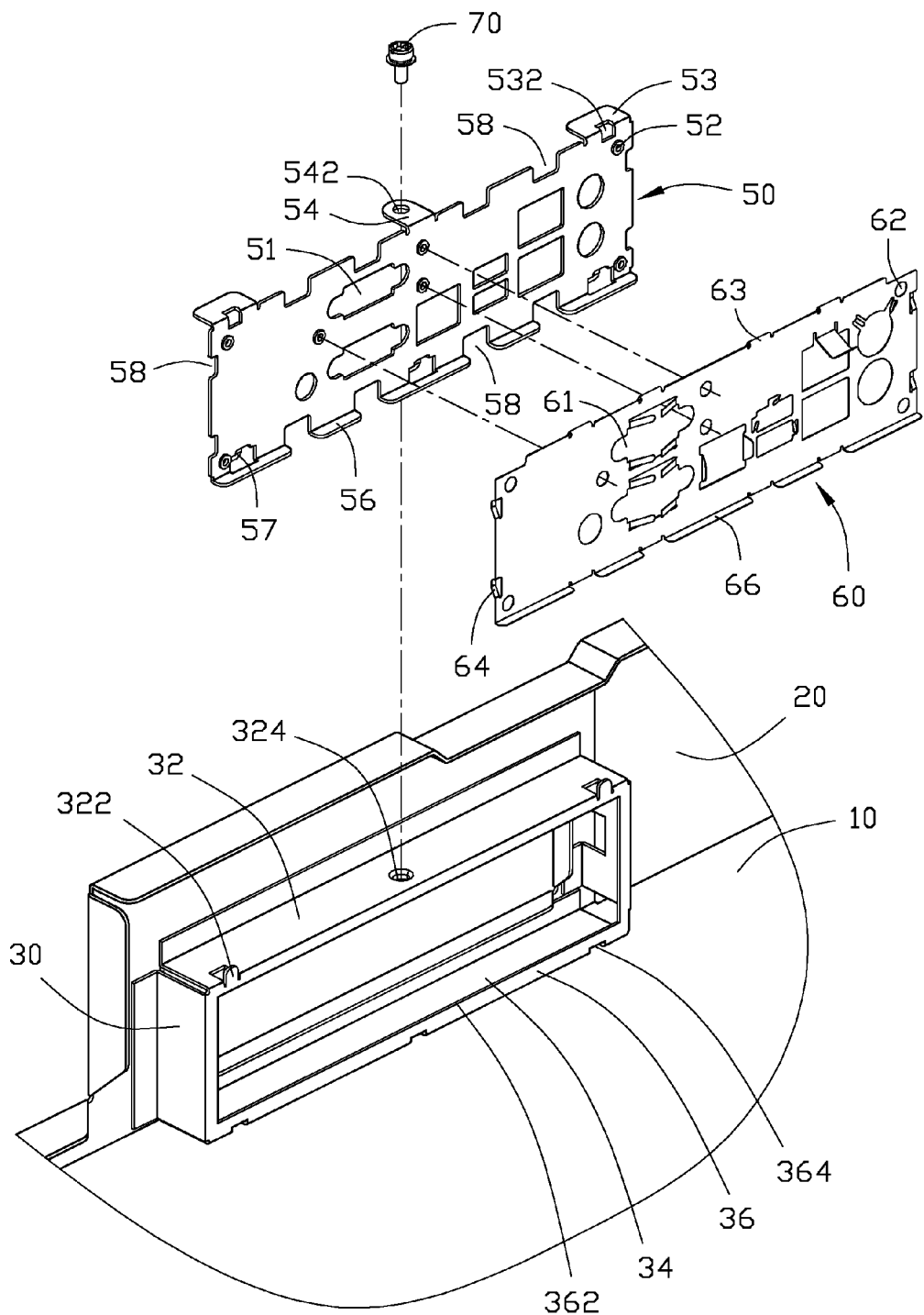
FIG. 1 is an exploded, isometric view of a computer enclosure in accordance with a preferred embodiment of the present invention.
Figure 2:
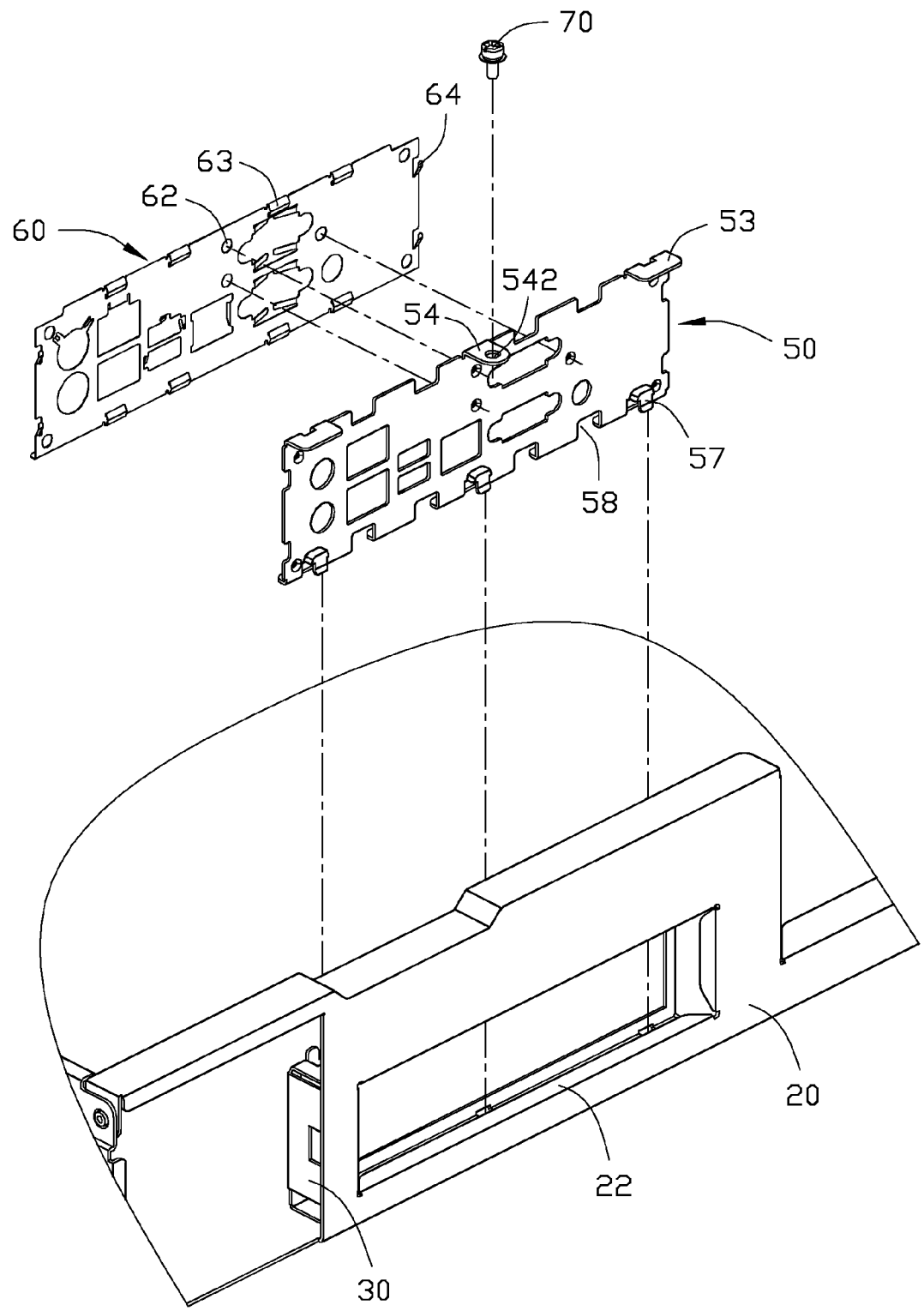
FIG. 2 is similar to of FIG. 1, but viewed from another aspect.

Referring to FIGS. 1 and 2, a computer enclosure includes a bottom plate 10, a rear plate 20 perpendicular to the bottom plate 10, an I/O plate 50 releasably attached on the rear plate 20, and a shielding plate 60.

The rear plate 20 defines a rectangular through opening 22 therein. A mounting bracket 30 is fixed on an inner surface of the rear plate 20 to cover the through opening 22. The mounting bracket 30 includes a top wall 32 perpendicular to the rear plate 20, a bottom wall 34 parallel to the top wall 32, and a front wall 36 parallel to the rear plate 20. Two engaging tabs 322 extend up from opposite ends of a front edge of the top wall 32, and are perpendicular to the top wall 32. A mounting hole 324 is defined in a middle portion of the top wall 32. A rectangular through opening 362 is defined in the front wall 36. Three positioning holes 364 are defined in a junction between the front wall 36 and the bottom wall 34.

The I/O plate 50 is configured for being secured on the mounting bracket 30 to cover the through opening 362 thereof. A plurality of connector openings 51 is defined in the I/O plate 50 for inserting corresponding electronic connectors of a circuit board therethrough. A plurality of posts 52 is formed on the I/O plate 50. Two support pieces 53 are bent rearward from opposite ends of a top edge of the I/O plate 50 and a mounting piece 54 is bent rearward from a central portion of the top edge. Each of the support pieces 53 defines a securing hole 532 therein extending to the I/O plate 50, for receiving the engaging tabs 322 of the mounting bracket 30. A mounting hole 542 is defined in the mounting piece 54 corresponding to the mounting hole 324 of the mounting bracket 30. A retaining flange 56 is bent perpendicularly frontward from a bottom edge of the I/O plate 50. Three inverted L-shaped locking pieces 57 are formed on a rear surface of the I/O plate 50, corresponding to the positioning holes 364 of the mounting bracket 30. A plurality of cutouts 58 is defined in edges of the I/O plate 50.

The shielding plate 60 is configured for being secured on the I/O plate 50 to improve EMI-proof capability of the I/O plate 50, and defines a plurality of connector openings 61 therein, corresponding to the connector openings 51 of the I/O plate 50, and a plurality of fixing holes 62, corresponding to the posts 52 of the I/O plate 50. A plurality of resilient clips 63 is bent rearward from top and bottom edges of the shielding plate 60, and a plurality of finger pieces 64 is formed on both side edges thereof. A support rim 66 is perpendicularly bent frontward from the bottom edge of the shielding plate 60.

Figure 3:
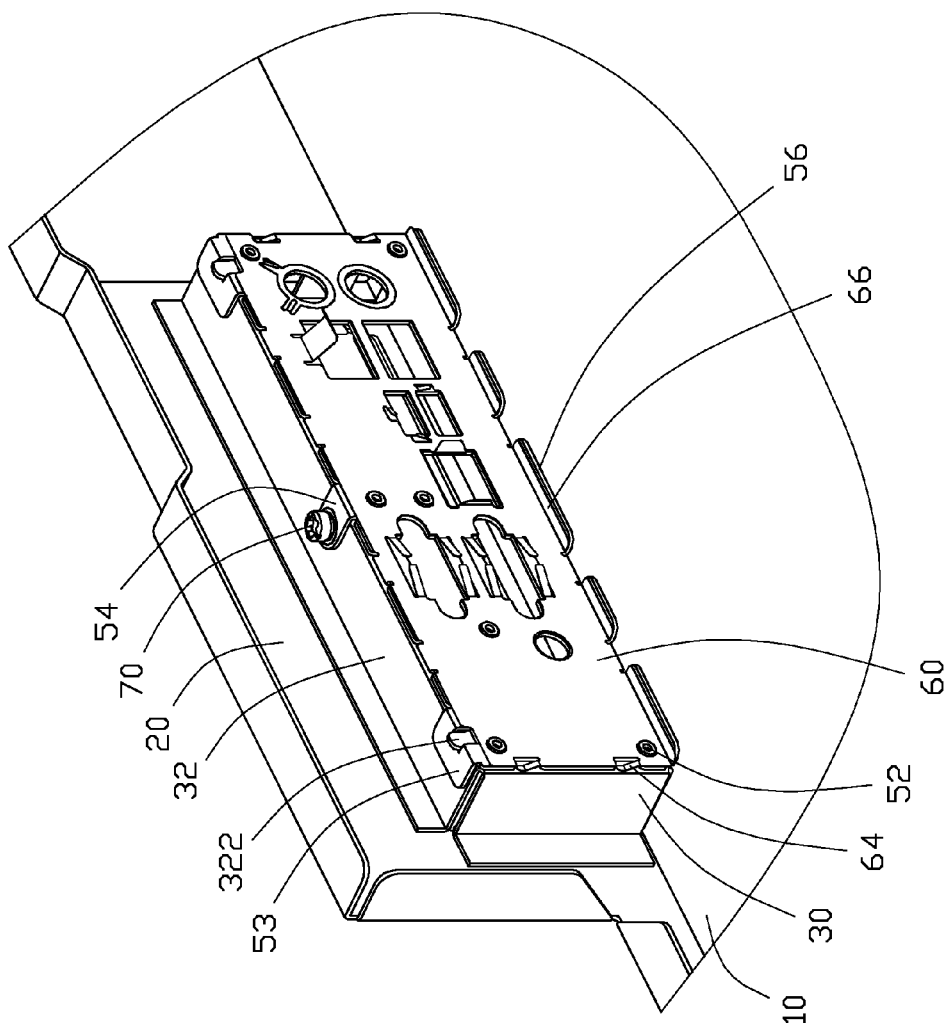
FIG. 3 is an assembled view of FIG. 1.

Referring also to FIG. 3, in assembly, the shielding plate 60 is secured on the I/O plate 50 with the posts 52 fixed into the corresponding fixing holes 62. The support rim 66 is positioned on the retaining flange 56. The connector openings 61 of the shielding plate 60 align with the connector openings 51 of the I/O plate 50, respectively. The resilient clips 63 and the finger pieces 64 of the shielding plate 60 are respectively inserted into the corresponding cutouts 58 of the I/O plate 50. The support rim 66 is located on the retaining flange 56 of the I/O plate 50. The locking pieces 57 of the I/O plate 50 are inserted into the corresponding positioning holes 364 of the mounting bracket 30 via the through opening 362. The retaining flange 56 of the I/O plate 50 is supported on the bottom plate 10. The support pieces 53 and the mounting piece 54 are located on the top wall 32 of the mounting bracket 30, and the engaging tabs 322 are respectively inserted into the securing holes 532 of the support pieces 53. The mounting hole 542 of the mounting piece 54 aligns with the mounting hole 324 of the top wall 32 of the mounting bracket 30. A mounting member 70, such as a thumbscrew, is secured into the mounting holes 542, 324 to fix the I/O plate 50 on the mounting bracket 30. Thus, the I/O plate 50 is removably secured on the mounting bracket 30.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
a rear plate defining a first through opening therein;
a bottom plate perpendicularly connected to the rear plate;
a mounting bracket secured on the rear plate to cover the first through opening of the rear plate, the mounting bracket comprising a top wall perpendicular to the rear plate and a front wall parallel to the rear plate, the top wall forming an engaging tab thereon, the front wall defining a second through opening therein corresponding to the first through opening of the rear plate; and
an interchangeable I/O plate configured for covering the second through opening of the front wall of the mounting bracket, the I/O plate defining a securing hole therein for receiving the engaging tab of the mounting bracket, a locking piece being formed on the I/O plate and together with the I/O plate sandwiching an edge of the second through opening of the front wall of the mounting bracket therebetween;
wherein the engaging tab extends towards a first direction parallel to the rear plate to engage in the securing hole, and the locking piece together with the I/O plate is movable towards a second direction opposite to the first direction to sandwich the edge of the second through opening of the mounting bracket; the top wall of the mounting bracket defines a mounting hole therein, the I/O plate defining a second mounting hole therein, the mounting hole of the top wall of the mounting bracket and the second mounting hole of the I/O plate being configured for receiving a mounting member therein to thereby securely mount the I/O plate on the mounting bracket; and the I/O plate defines a plurality of cutouts, the computer enclosure further comprising a shielding plate which is secured on the I/O plate and forms a plurality of resilient clips and finger pieces for inserting through the cutout of the I/O plate to electrically touch the front wall of the mounting bracket.

2. The computer enclosure as described in claim 1, wherein the engaging tab extends perpendicularly from the top wall, so that the I/O plate cannot be detached from the mounting bracket along a direction perpendicular to the rear plate after the engaging tab is inserted into the securing hole of the I/O plate.

3. The computer enclosure as described in claim 1, wherein a support piece and a mounting piece are perpendicularly bent from the I/O plate, and the securing hole and the second mounting hole of the I/O plate are respectively defined in the support piece and the mounting piece.

4. The computer enclosure as described in claim 3, wherein the support piece, the mounting piece, and the locking piece are positioned on a same side of the I/O plate facing the mounting bracket.

5. The computer enclosure as described in claim 1, wherein the mounting bracket further comprises a bottom wall, a positioning hole being defined at a junction between the bottom wall and the front wall for the locking piece of the I/O plate inserting therethrough.

6. A computer enclosure comprising:
a rear plate defining a first through opening therein;
a mounting bracket secured on the rear plate to cover the first through opening of the rear plate, the mounting bracket comprising a top wall perpendicular to the rear plate and a front wall parallel to the rear plate, the front wall defining a second through opening therein corresponding to the first through opening of the rear plate;
an I/O plate configured for covering the second through opening of the front wall of the mounting bracket;
a positioning structure formed on the mounting bracket and the I/O plate to locate the I/O plate on the mounting bracket; and
a mounting member securing the I/O plate on the mounting bracket to prevent the I/O plate from releasing from the mounting bracket;
wherein the I/O plate is slidable along a direction parallel to the rear plate to be attached to or detached from the mounting bracket; and the I/O plate defines a plurality of cutouts, the computer enclosure further comprising a shielding plate which is secured on the I/O plate and forms a plurality of resilient clips and finger pieces for inserting through the cutout of the I/O plate to electrically touch the front wall of the mounting bracket.

7. The computer enclosure as described in claim 6, wherein the positioning structure comprises an engaging tab formed on the top wall of the mounting bracket and a support piece formed on the I/O plate, the support piece defining a securing hole therein for receiving the engaging tab.

8. The computer enclosure as described in claim 7, wherein the positioning structure further comprises a locking piece formed on the I/O plate, the locking piece cooperating with the I/O plate sandwiches an edge of the second through opening of the front wall of the mounting bracket therebetween.

9. The computer enclosure as described in claim 8, the mounting bracket further comprises a bottom wall, a positioning hole being defined at a junction between the bottom wall and the front wall for the locking piece of the I/O plate inserting therethrough.

10. The computer enclosure as described in claim 6, wherein the top wall of the mounting bracket defines a mounting hole therein, the I/O plate defining a second mounting hole therein, the mounting hole of the top wall of the mounting bracket and the second mounting hole of the I/O plate being configured for receiving the mounting member therein to thereby securely mount the I/O plate on the mounting bracket.

11. The computer enclosure as described in claim 10, wherein a support piece and a mounting piece are perpendicularly bent from the I/O plate, and the securing hole and the second mounting hole of the I/O plate are respectively defined in the support piece and the mounting piece.

12. The computer enclosure as described in claim 7, wherein the engaging tab is perpendicular to the top wall, so that the I/O plate cannot be detached from the mounting bracket along a direction perpendicular to the rear plate after the engaging tab is inserted into the securing hole of the I/O plate.

* * * * *